United States Patent [19]

Bourassa et al.

[11] Patent Number: 5,590,858
[45] Date of Patent: Jan. 7, 1997

[54] DEVICE BOX SUPPORT

[75] Inventors: Alain Bourassa, Laval; Sylvain Poissant, Montréal; Alain Legris, LaSalle; Claude Lacroix, Montréal, all of Canada

[73] Assignee: Temco Electric Products Co. Inc., Montréal, Canada

[21] Appl. No.: 514,181

[22] Filed: Aug. 11, 1995

[30] Foreign Application Priority Data

Jul. 5, 1995 [CA] Canada ................................. 2153298

[51] Int. Cl.⁶ ..................................................... H02G 3/12
[52] U.S. Cl. .......................... 248/27.1; 248/300; 248/906
[58] Field of Search ................................... 248/27.1, 906, 248/300, 544, 201, 222.51, 224.8, 225.21; 220/3.6, 3.5, 3.3, 3.9; 174/58

[56] References Cited

U.S. PATENT DOCUMENTS

| | | | |
|---|---|---|---|
| 2,605,012 | 7/1952 | Duncan | 248/906 X |
| 3,337,168 | 8/1967 | Albrecht | 248/27.1 |
| 3,767,151 | 10/1973 | Seal et al. | 248/906 X |
| 4,055,738 | 10/1977 | Beck | 248/27.1 X |
| 4,108,414 | 8/1978 | Grant, Sr. | 248/27.1 X |
| 4,971,280 | 11/1990 | Rinderer | 248/906 X |

*Primary Examiner*—Ramon O. Ramirez
*Attorney, Agent, or Firm*—Darby & Darby

[57] ABSTRACT

A support for mounting an electrical device box into an opening made in a panel. This support has an elongated bar-shaped member longer than the device box and two L-shaped members coplanar to and projecting from one side of the bar-shaped member. The distance between each one of the opposite ends of the bar-shaped member and the remote point of this bar-shaped member from which the remote L-shaped member projects is substantially equal to the height of the electrical box. In use, one can easily insert the bar-shaped member behind the panel through the opening made in the panel by first introducing one of the opposite ends of the bar-shaped member into the opening and moving this one end until the adjacent L-shaped member contacts the panel. Then, the support can be rotated so that the other opposite end of the bar-shaped member passes through the opening, such being possible because of the above mentioned distance selection. Fixation of the device box within the opening is subsequently achieved by folding back into the box the two L-shaped members.

8 Claims, 4 Drawing Sheets

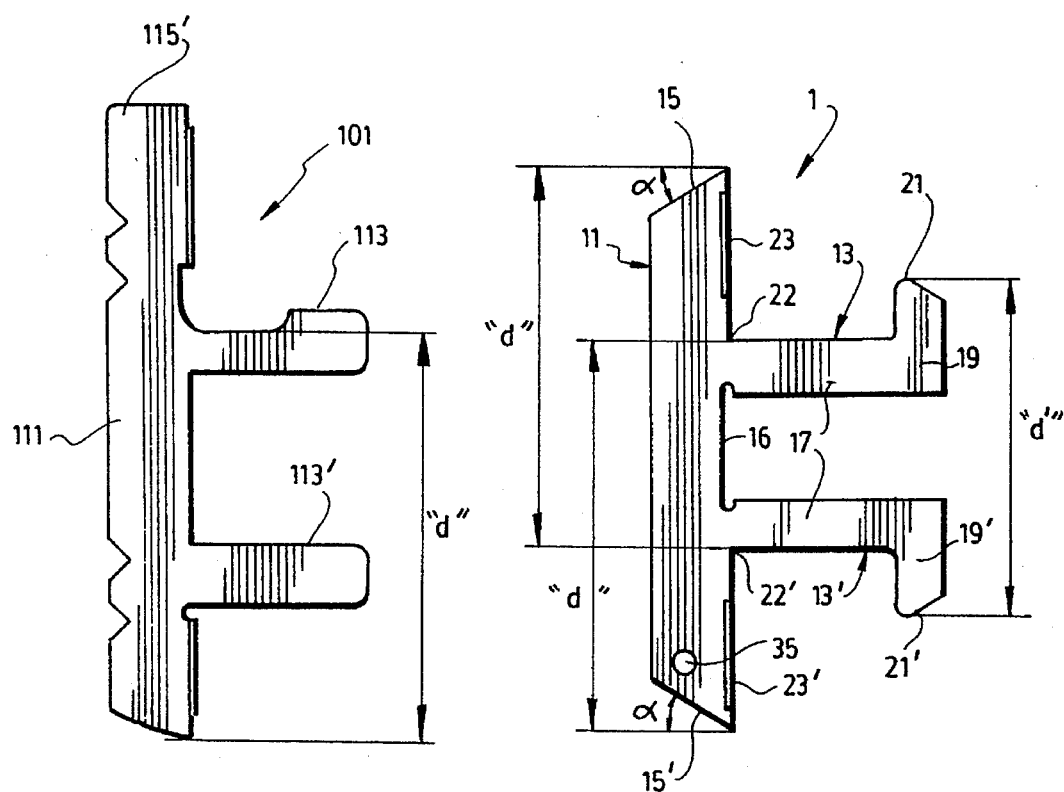
FIG. 1
(PRIOR ART)
FIG. 2
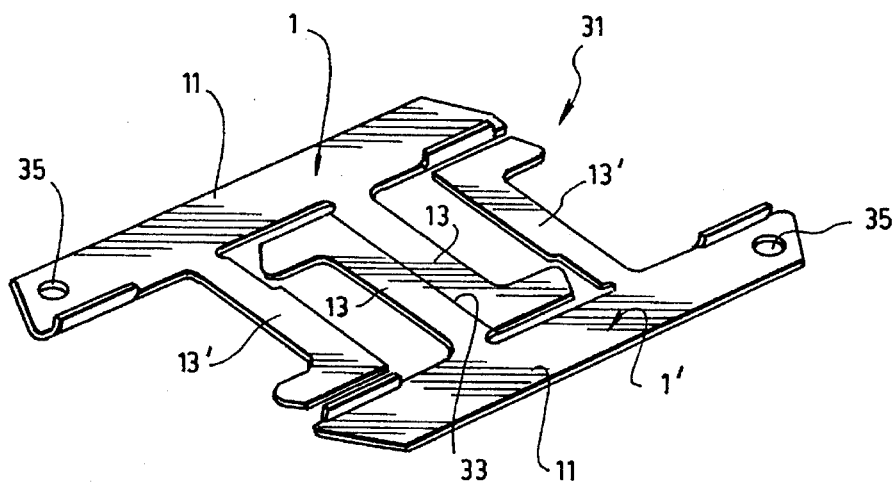
FIG. 3

DEVICE BOX SUPPORT

BACKGROUND OF THE INVENTION a) Field of the Invention

The present invention relates to an improved support for mounting a device box into an opening made in a wall panel, such as a gypsum panel.

The term "device box" as used herein is a generic term that is used in the trade for designating electrical outlet boxes, electrical wiring boxes or any similar boxes used for installing electrical equipments and connections, especially into a building or dwelling.

b) Background of the Invention

Electrical device boxes are extensively used in buildings and dwellings. Such boxes are usually made of metal and are shaped to define a rectangular housing with an open front and a pair of top and bottom tabs. In use, the boxes are fixed to a supporting structure such as the lateral side of a wood stud or the like.

For some very specific application, the device boxes may also be mounted into openings made in the wall panels of a building or dwelling. In such a case, especially if there is no underlying stud adjacent the opening, it is necessary to fix the box to the panel itself. Because the panels are usually made of gypsum or any similar material in which nails or screws cannot be used as reliable attachment means, supports have been devised, like the one shown in FIG. 1 of the drawings, identified as "prior art".

This known support 101 which is presently sold in Canada by COMMANDER, comprises an elongated bar-shaped member 111 from one side of which two transverse members 113, 113' project at substantially the same distance away. In use, the bar-shaped member is inserted behind the panel through the opening. After such an insertion the transverse members are folded back into the open front of the device box in such a manner that the panel be "squeezed" between the locking tabs of the device box and the bar-shaped member, thereby achieving the requested mounting.

As can be seen in FIG. 1, the transverse members 113, 113' are not positioned at a same distance away from the adjacent ends of the bar-shaped member 111. Actually, one of these transverse members, viz. the one numbered 113, is positioned at a longer distance from its adjacent end than the other so as to give more room for the insertion of the bar-shaped member behind the panel. Of course, because of the symmetry of the support, such insertion of the bar-shaped member 111' can be done only in one way, viz. by inserting the end 115' of the bar-shaped member and only this one first into the opening.

In practice, the transverse members 113, 113' must be spaced away from each other so as to keep the bar-shaped member in position behind the panel when they are folded back in the support box. However, they cannot be spaced as much as they could, because of their asymmetry along the length of the bar-shaped member 111. Accordingly, there is always a substantial "slack" during installation, which prevents the bar-shaped member from being properly centered behind the panel, with both of its opposite ends bearing against the panel over substantially the same height.

SUMMARY OF THE INVENTION

The object of the present invention is to provide a support of the above mentioned type, which is fully symmetrical and thus much easier to install since any one of the opposite ends of the bar-shaped member can be inserted first, and in which the transverse members are so shaped as to keep the bar-shaped member properly centered behind the panel after it has been inserted into the opening made in the same.

In accordance with the invention, this object is achieved with a support for mounting a device box of a given height into an opening of substantially the same height made in a panel, said support comprising, like all the existing supports:

an elongated bar-shaped member longer than the height of the debbie box, the bar-shaped member having opposite ends; and two transverse members coplanar to and projecting from one side of the bar-shaped member.

In accordance with a first original aspect of the invention, the transverse members of the support are L-shaped and have long arms of the same length connected at one end to the bar-shaped member. The L-shaped members also have short arms projecting from the long arms at a same distance from the bar-shaped member, these short arms having free ends extending away from each other.

In accordance with second original aspect of the invention, the distance between every one of the opposite ends of the bar-shaped support and the remote point on the one side of the bar-shaped member from which the remove L-shaped member projects is substantially equal to the height of the electrical box. Moreover, the distance between the free ends of the short arms of the L-shaped members is slightly smaller that the height of the electrical box.

Thus, in use, insertion of the bar-shaped member through the opening behind the panel can easily be made by first introducing any one of the opposite ends of the bar-shaped member into the opening, then moving this one end until the adjacent L-shaped member contacts the panel, and finally rotating the support so that the other opposite end of the bar-shaped panel passes through the opening, such being possible because of the above mentioned distance selection. Fixation of the device box within the opening may subsequently be completed by folding back into the box the two L-shaped members in such a manner that, on the one hand, the one side of the bar-shaped member bears against the panel behind the same and, on the other hand, the free ends of the short arms of the L-shaped members that have been folded back into the box, keep the bar-shaped member centered in bearing position behind this opening.

Since the support according to the invention is fully symmetrical, it is much easier to use since any one of the opposite ends of the bar-shaped member can be introduced first into the opening.

Moreover, thanks to the L-shape of its transverse members, the support according to the invention can be substantially shorter in size than the existing supports like the one disclosed as "prior art" hereinabove. As a result, its installation is substantially facilitated while its centering behind the panel is "guaranteed".

BRIEF DESCRIPTION OF THE DRAWINGS

The invention and its advantages will be better understood upon reading the following non-restrictive description of a preferred embodiment thereof, given with reference to the accompanying drawings in which:

FIG. 1 which is identified as "prior art", is a plan view of a known device box support presently available in the trade;

FIG. 2 is a plan view of a device box support according to the present invention;

FIG. 3 is a perspective view of a kit comprising two supports as shown in FIG. 2;

DESCRIPTION OF A PREFERRED EMBODIMENT OF THE INVENTION

Figure 4:
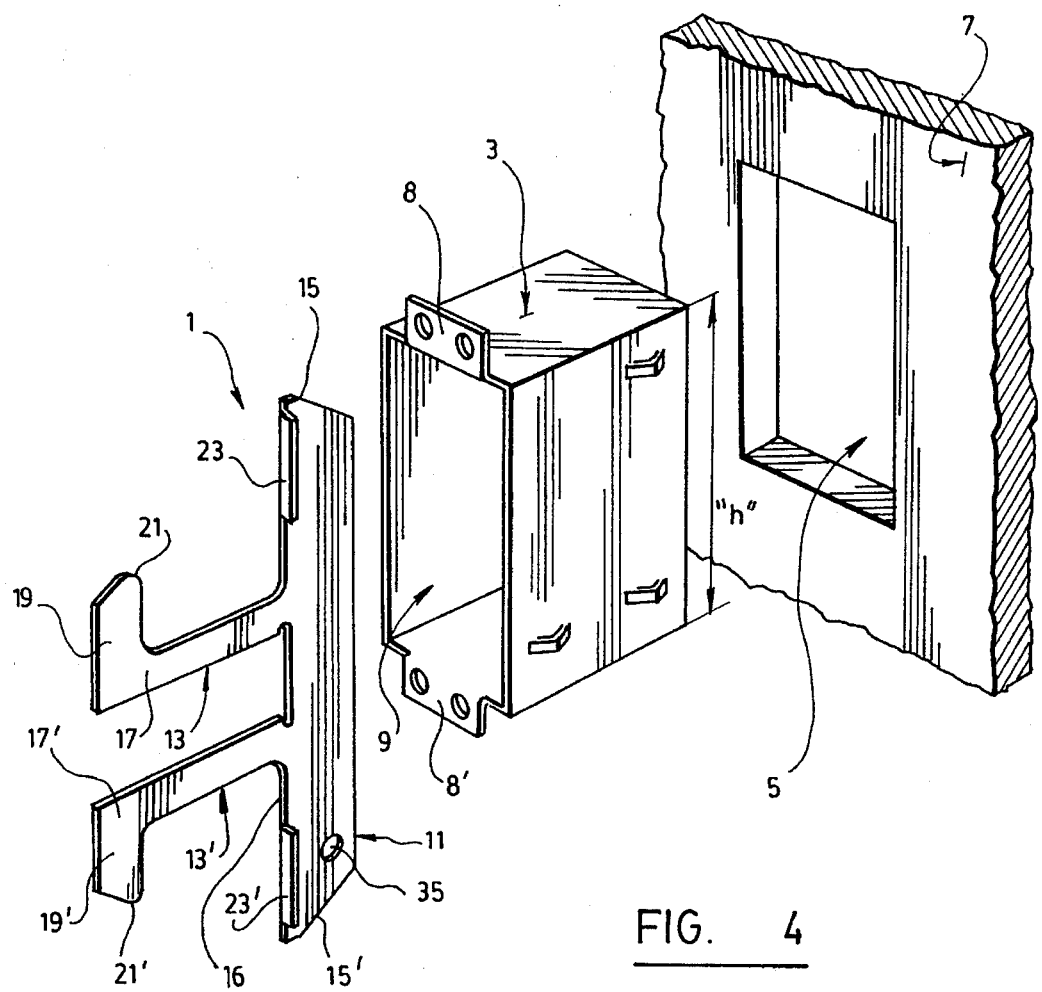
FIG. 4 is an exploded perspective view of an assembly including a panel with an opening in it, a device box sized to be inserted into the opening and one of the supports according to the invention that can be used to fix the box into the opening.
Figure 5:
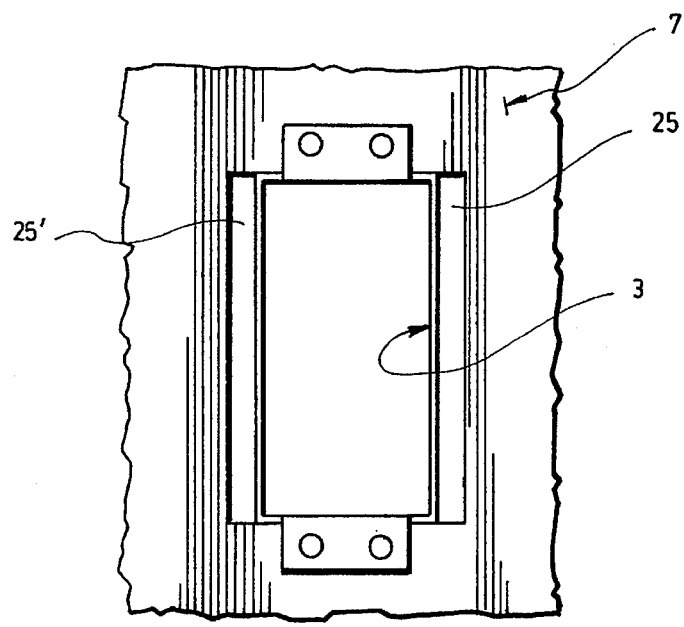
FIG. 5 is a front elevational view of the panel with the device box shown in FIG. 4 inserted into the opening.

The support 1 according to the invention is intended to be used for mounting a device box 3 of a given height "h" into an opening 5 of substantially the same height made in a panel 7, as is shown in FIGS. 4 and 5.

The device box 3 is of conventional structure. It is made of metal and shaped to define a rectangular housing with an open front 9 and a pair of upper and lower locking tabs 8, 8'.

As is better shown in FIGS. 2 and 4, the support 1 used for mounting the device box basically comprises an elongated bar-shaped member 11 and two L-shaped members 13, 13' that are preferably integral to each other and made by stamping of a metal sheet.

The elongated bar-shaped member 11 is longer than the height of the device box 3 and comprises two opposite ends 15, 15'. As is clearly shown in FIG. 2, each of the opposite ends 15, 15' extends rearwardly at an angle α equal to about 40° from the one side 16 of the bar-shaped member 11 from which the L-shaped members 13, 13' project, so as to facilitate the passage of the opposite ends within the opening 5 as will be better explained hereinafter.

As is also shown, the two L-shaped members 13, 13' are coplanar to and projecting from the one side 16 of the bar-shaped member 11. These L-shaped members have long arms 17, 17' of the same length connected at one end to the bar-shaped member. They also have short arms 19, 19' projecting from the long arms at a same distance from the bar-shaped member. These short arms are preferably parallel to the bar-shaped member 11 and have tapered free ends 21, 21' that extend away from each other.

In accordance with a very important aspect of the invention, the distance "d" between each one of the opposite ends 15, 15' of the bar-shaped member 11 and the remote point 22, 22' on the one side 16 of this bar-shaped member from which the remote L-shaped member 13, 13' projects, is substantially equal to the height "h" of the electrical box.

In accordance with another very important aspect of the invention, the distance "d" between the free ends 21, 21' of the short arms 19, 19' of the L-shaped members is slightly smaller that the height "h" of the electrical box.

Figure 6:
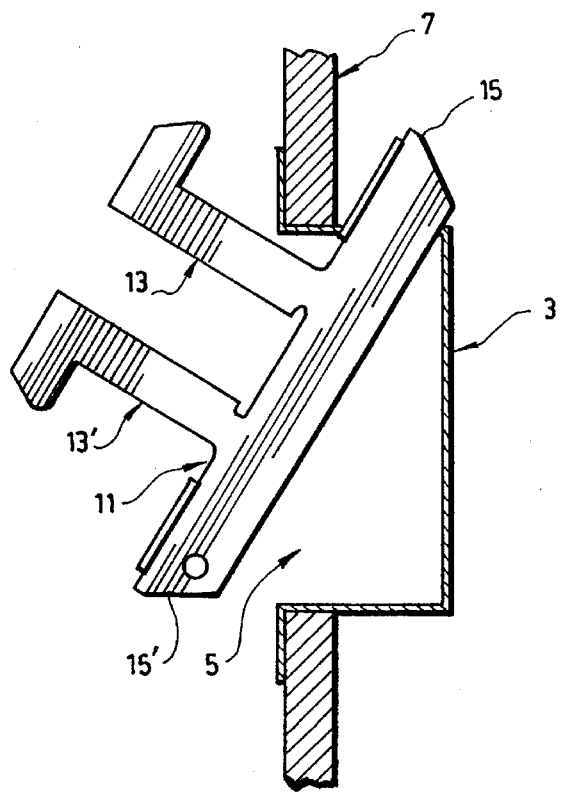
FIGS. 6 to 8 are cross-sectional, side elevational view of the assembly shown in FIG. 4, illustrating how each support can be inserted into the opening of the panel are used to fix the box into the same.
Figure 7:
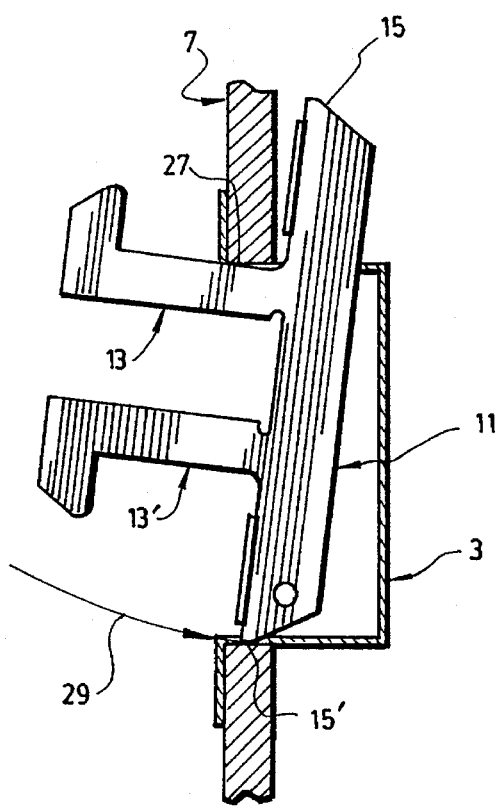

In use, the person in charge of mounting the device box 3 into the opening 5 made in the panel 7 must insert the bar-shaped member 11 behind the panel through the opening 5 by first introducing any one of the opposite ends 15, 15' of this bar shaped member into one of the gaps 25 left on both sides of the opening when the box is mounted within the same (see FIG. 5). This first step is illustrated in FIG. 6. Then, the one end 15 that has been introduced into the opening, is moved up until the adjacent L-shaped member 13 contacts the upper edge 27 of the opening. Subsequently, the whole support is rotated as shown with the arrow 29 in FIG. 7, so that the other opposite end 15' of the bar-shaped member 11 pass through the opening. Because of its symmetry, the support can be introduced in any direction, and the same movement as above could be made in the other way, viz. by introducing the opposite end 15' first and then rotating the other opposite end 15 through the opening into the panel.

Figure 8:
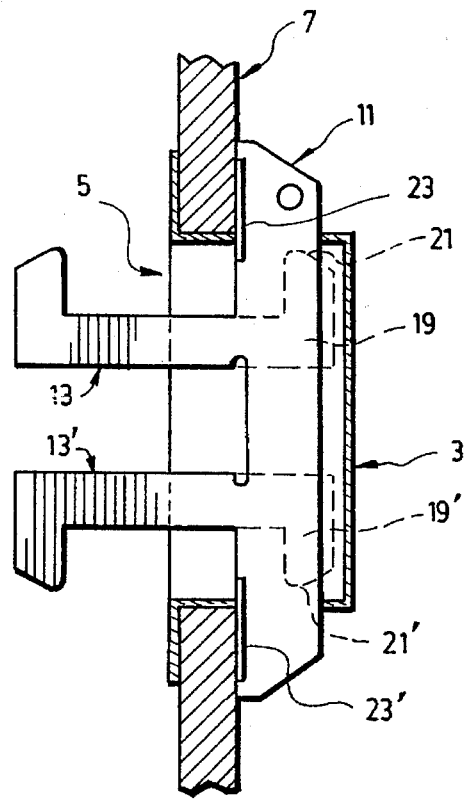
Figure 9:
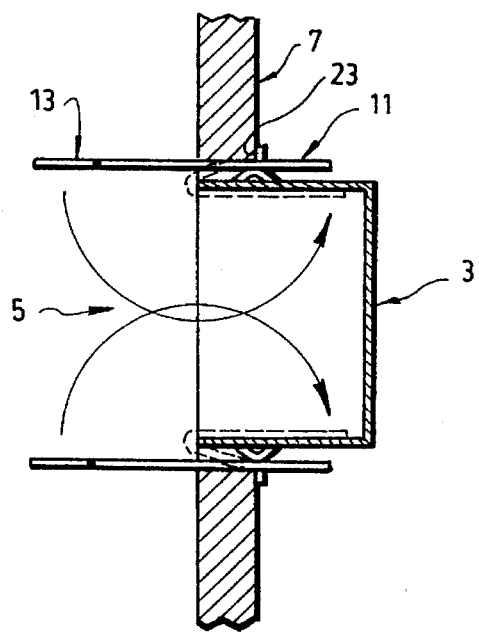
FIG. 9 is cross-sectional, top plan view of the assembly shown in FIG. 4, illustrating how the L-shaped members of each support can be folded back to complete the fixation of the device box.

Once such an insertion is completed, fixation of the device box 3 within the opening 5 is achieved after the box 3 has been inserted into the opening 5 by folding back into the box both L-shaped members 13, 13' as shown in FIGS. 8 and 9, in such a manner that the one side 17 of the bar-shaped member 11 bears against the panel 7 behind the same while the free ends 21, 21' of the short arms 19, 19' of the L-shaped members 13, 13' that have been folded back inside the box, actually keep this bar-shaped member 11 centered in bearing position behind the opening 5.

As is shown, the one side 17 of the bar-shaped member 11 from which the L-shaped members 13, 13' project, is preferably provided with a set of stamped flanges 23, 23' extending over at least part of the length of the support in a direction perpendicular to the plane in which the bar-shaped and L-shaped members extend, so as to bear flat against the back of the panel when the support is installed and thus to prevent the same from being inadvertently "cut" (see FIG. 9).

Of course, to complete the installation of the device box 3 into the opening 5, another support 1' identical to the one described hereinabove should be mounted into other the gap 25 on the other side of the device box within the opening (see FIG. 5), so that both sides of the device box be rigidly held to the panel.

For this purpose, the supports 1 and 1' that are used in pair, may be manufactured and sold as a kit. As shown in FIG. 3, this kit 31 may be stamped from the same metal sheet so that the supports 1,1' have their bar-shaped members 11 extending parallel to each other and their L-shaped members 13, 13' staggered with respect to each other. In such a kit, the supports 1 and 1' are detachably connected to each other by means of a stamped, easy-to-tear line 33 extending along the adjacent inner edges of their staggered L-shaped members 13.

Of course, numerous modifications could be made to the above described support without departing from the scope of the invention as defined in the appended claims. Thus, for example, the length of each of long arms 17, 17' of the L-shaped members could be selected so as to accommodate at least two different standard panel thicknesses (½" or ⅝" in the case of gypsum panels). Similarly, the bar-shaped member 11 of the support 1 could be provided with a through-hole 35 stamped adjacent one of its opposite ends 15', to allow hanging of the same, whenever such is required.

The embodiments of the invention in which an exclusive property or privilege is claimed are defined as follows:

1. A support for mounting a device box of a given height into an opening of substantially the same height made in a panel, said support comprising:

an elongated bar-shaped member longer than the height of the device box, said bar-shaped member having opposite ends; and two L-shaped members coplanar to and projecting from one side of the bar-shaped member, said L-shaped members having long arms of the same length connected at one end to the bar-shaped member, said L-shaped members also having short arms projecting from said long arms at a same distance from said bar-shaped member, said short arms having free ends extending away from each other;

wherein the distance between each one of the opposite ends of the bar-shaped member and the remote point on the one side of said bar-shaped member from which the remote L-shaped member projects is substantially equal to the height of the device box; and wherein the distance between the free ends of the short arms of the L-shaped members is slightly smaller that the height of the device box;

whereby, in use, one can easily insert the bar-shaped member behind the panel through the opening made in said panel by first introducing one of the opposite ends of said bar-shaped member into the opening and moving said one end until the adjacent L-shaped member contacts the panel, and then rotating the support so that the other opposite end of the bar-shaped member pass through the opening, such being possible because of the above mentioned distance selection; fixation of the device box within the opening being subsequently completed by folding back into said box both of said L-shaped members in such a manner that the one side of the bar-shaped member bears against the panel behind the same, the free ends of the short arms of the L-shaped members folded back inside the box then keeping said bar-shaped member centered in bearing position behind this opening.

2. The support of claim 1, wherein said bar-shaped and L-shaped members are integral to each other and made by stamping of a sheet of metal.

3. The support of claim 2, wherein the one side of the bar-shaped member from which the L-shaped members project, is provided with a set of stamped flanges extending over at least part of the length of said one side in a direction perpendicular to the plane in which the bar-shaped and L-shaped members extend.

4. The support of claim 3, wherein each of the opposite ends of the bar-shaped member extends rearwardly at an angle from the one side of said bar-shaped member from which the L-shaped members project, so as to facilitate the passage of said opposite ends within the opening.

5. A support as claimed in claim 4, wherein the length of each of long arms of the L-shaped member is selected to accommodate at least two different standard panel thicknesses.

6. The support of claim 5, wherein the bar-shaped member is provided with a hanging through-hole stamped adjacent one of its opposite ends.

7. A kit comprising two supports as claimed in claim 3, said supports being stamped from the same sheet of metal so as to have their bar-shaped members extending parallel to each other and their L-shaped members staggered with respect to each other, said supports being detachably connected to each other by means of a stamped, easy-to-tear line extending along adjacent inner edges of two of their staggered L-shaped members.

8. A kit comprising two supports as claimed in claim 6, said supports being stamped from the same sheet of metal so as to have their bar-shaped members extending parallel to each other and their L-shaped members staggered with respect to each other, said supports being detachably connected to each other by means of a stamped, easy-to-tear line extending along adjacent inner edges of two of their staggered L-shaped members.

* * * * *